United States Patent [19]
Watson

[11] Patent Number: 5,818,937
[45] Date of Patent: Oct. 6, 1998

[54] TELEPHONE TONE SECURITY DEVICE

[75] Inventor: Gary E. Watson, Dayton, Ohio

[73] Assignee: NCR Corporation, Dayton, Ohio

[21] Appl. No.: 695,464

[22] Filed: Aug. 12, 1996

[51] Int. Cl.$^6$ ............................... H04L 9/32; H04L 9/30; H04L 9/00
[52] U.S. Cl. ................................. 380/25; 380/9; 380/21; 380/23; 380/30; 380/49
[58] Field of Search .................. 380/9, 21, 23, 380/24, 25, 30, 49, 50, 59

[56] References Cited

U.S. PATENT DOCUMENTS

| | | | |
|---|---|---|---|
| 3,956,615 | 5/1976 | Anderson et al. | 380/24 |
| 4,023,013 | 5/1977 | Kinker | 380/24 X |
| 4,186,871 | 2/1980 | Anderson et al. | 380/24 |
| 4,214,230 | 7/1980 | Fak et al. | 380/24 X |
| 4,234,932 | 11/1980 | Gorgens | 380/24 X |
| 4,259,720 | 3/1981 | Campbell | 380/24 |
| 4,635,054 | 1/1987 | Goldman | 340/825.34 |
| 4,707,592 | 11/1987 | Ware | 235/379 |
| 4,868,376 | 9/1989 | Lessin et al. | 235/492 |
| 4,885,788 | 12/1989 | Takaragi et al. | 380/23 |
| 4,998,279 | 3/1991 | Weiss | 380/23 |
| 5,014,311 | 5/1991 | Schrenk | 380/23 |
| 5,020,105 | 5/1991 | Rosen et al. | 380/23 |
| 5,050,207 | 9/1991 | Hitchcock | 379/96 |
| 5,068,894 | 11/1991 | Hoppe | 380/23 |

*Primary Examiner*—Bernarr E. Gregory
*Attorney, Agent, or Firm*—Gregory A. Welte

[57] ABSTRACT

An encryption device. A user wishes to identify himself to a remote party, over a telephone line. The remote party provides a Transaction Number, TN, to the user. The TN is given to the encryption device. The user gives the encryption device a Personal Identification Number, PIN. The encryption device generates a random number, combines it with the PIN and TN, to form an Authorization Number, AN, and encrypts the AN into cypher text. The cypher text is transmitted to the remote party, together with the user's name. The remote party de-crypts the cypher text, to obtain the TN and PIN. Using the name received from the user, and a table of names, and their associated PINs, the remote party verifies whether the PIN obtained from the AN matches the PIN assigned to the name given by the user. If so, the user's identity is considered verified, but without requirement that the user disclose a PIN, in plain text form, over a telephone.

20 Claims, 6 Drawing Sheets

TELEPHONE TONE SECURITY DEVICE

BACKGROUND OF THE INVENTION

Many transactions are undertaken by telephone, such as credit card purchases and banking transactions. These transactions require that one party accurately learn the identity of the other party.

Commonly, personal identification numbers (PINs) are used to establish identification. But telephone transactions requiring disclosure of PINs are often avoided by people who do not wish to disclose their PINs, thereby reducing the utility of PINs, and precluding these people from taking advantage of the convenience of such transactions.

OBJECTS OF THE INVENTION

An object of the invention is to provide an improved identification system.

A further object of the invention is to provide an identification system which uses telephone channels, in which no pilferable data is made available to eavesdroppers.

SUMMARY OF THE INVENTION

In one form of the invention, a caller provides the caller's name and an encrypted PIN to a party who wishes to confirm the caller's identity. The party de-crypts the PIN, and also ascertains the PIN assigned to the name given by the caller. If the two PINs match, the caller's identity is presumed to be verified.

DETAILED DESCRIPTION OF THE INVENTION

Figure 1:
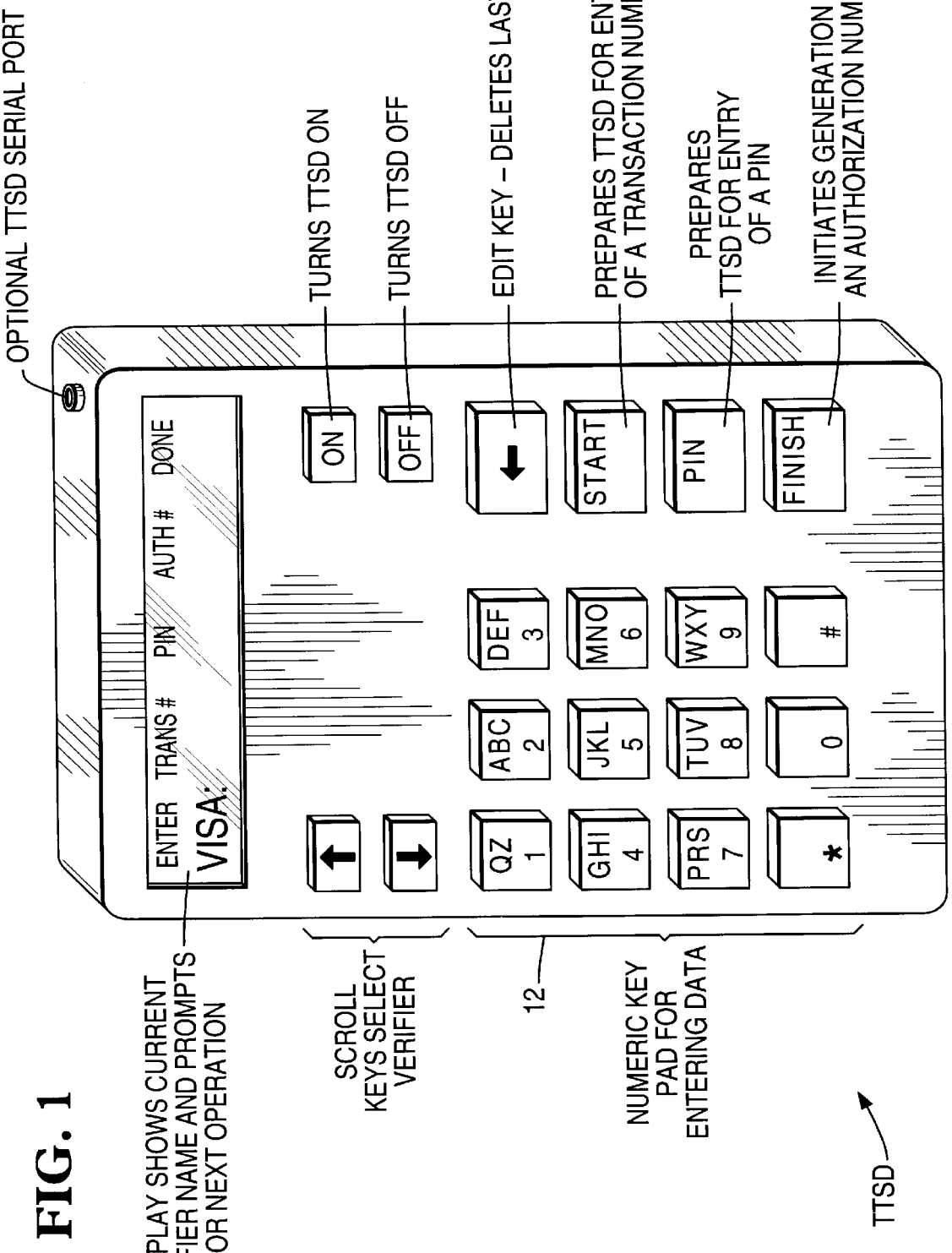
FIG. 1 illustrates one form of the invention.

FIG. 1 illustrates one form of the invention, termed a Telephone Tone Security Device, TTSD. Assume that a caller 2 in FIG. 2A wishes to order merchandise by telephone, from a merchant 3, and wishes to pay for the merchandise by billing to a credit card account, which is handled by a verifier 6.

Figure 2A:
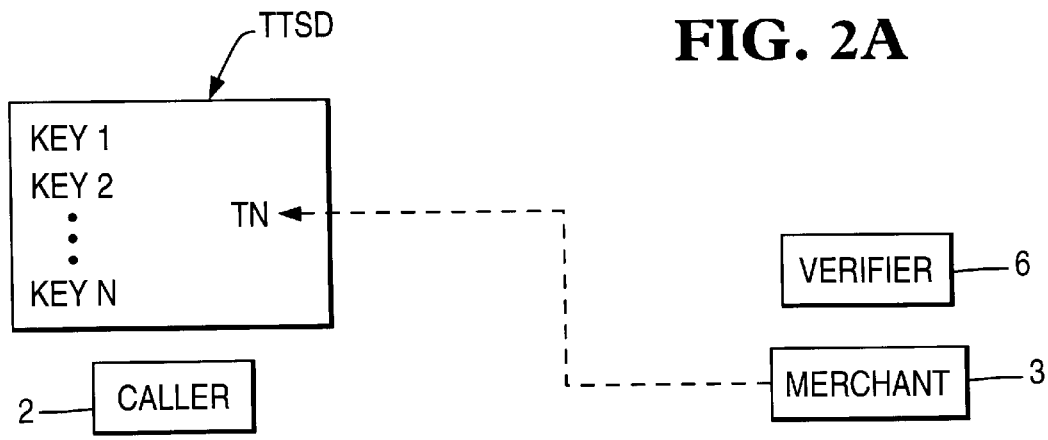
FIGS. 2A–2C illustrate a sequence of events undertaken by the invention.

The caller establishes a telephone connection with the merchant 3. The merchant transmits a transaction number, TN, to the caller, as indicated by the dashed arrow in FIG. 2A. This transaction number can be transmitted in several ways. For example, it can be spoken, in which case the caller 2 listens to it, and enters it into the TTSD, using the keypad 12 in FIG. 1. However, to avoid key-entry errors, it may be preferable to transmit the transaction number in the form of dual-tone multi-frequency (DTMF) signals. The TTSD receives the DTMF signals, decodes them, and stores the transaction number TN as indicated in FIG. 2A.

Figure 2B:
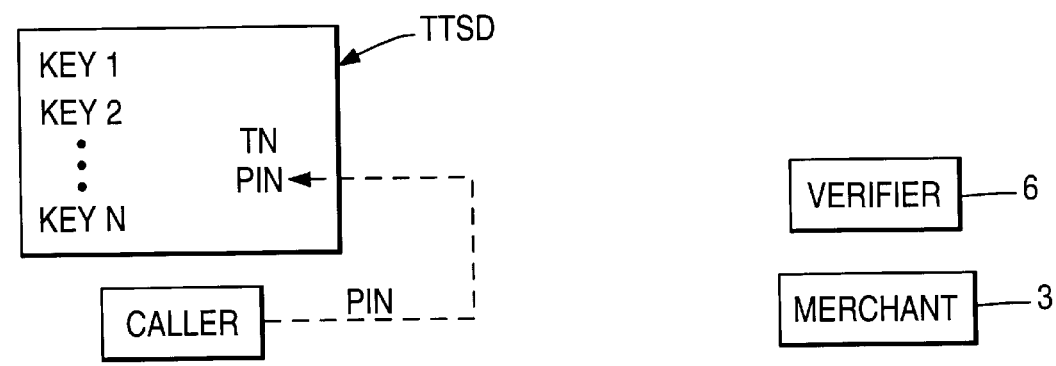

Next, the caller enters a personal identification number, PIN, into the TTSD, using the keypad 12 in FIG. 1. The PIN is stored in the person's mind, and is, for that reason, secret. Now, the TTSD contains both the transaction number TN and the PIN, as indicated in FIG. 2B.

Figure 2C:
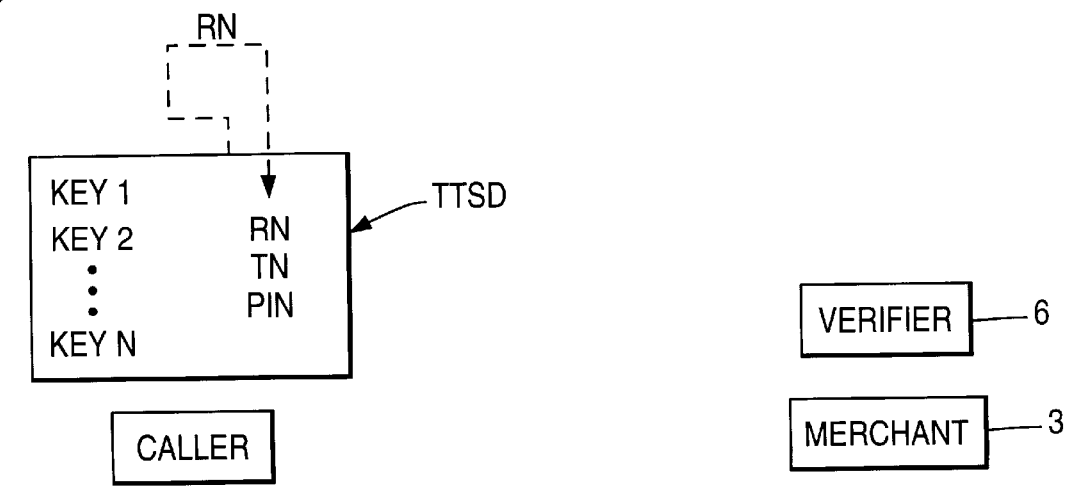

Then, the TTSD generates a random number, RN, as indicated in FIG. 2C, which is used as padding. The transaction number and the PIN are arranged according to one of the formats M1 or M2, shown in FIG. 3, or another suitable format. The digits P represent the PIN; the digits T represent the TN; and the digits R represent the random number.

The purpose of the padding is to create difficulty for a hacker, by creating a message which is longer than strictly necessary to convey the underlying information, namely, the PIN and the TN.

Figure 3:
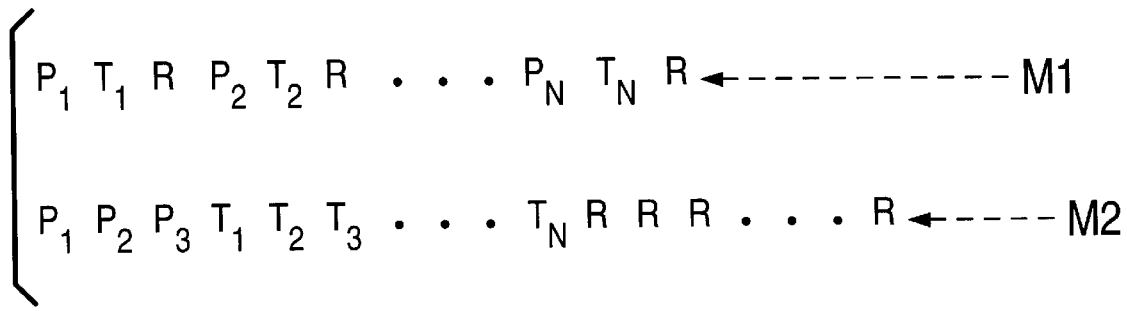
FIG. 3 illustrates interleaving of a transaction number, having digits T1, T2, etc., a PIN, having digits P1, P2, etc., and a random number, having digits R.

The combined TN, PIN, and RN, as in FIG. 3, represent an authorization number AN. It is customary to refer to a message in non-encrypted form, such as the AN, as "plain text" or "clear text." The AN, in encrypted form, is customarily referred to as "cypher text."

Figure 4A:
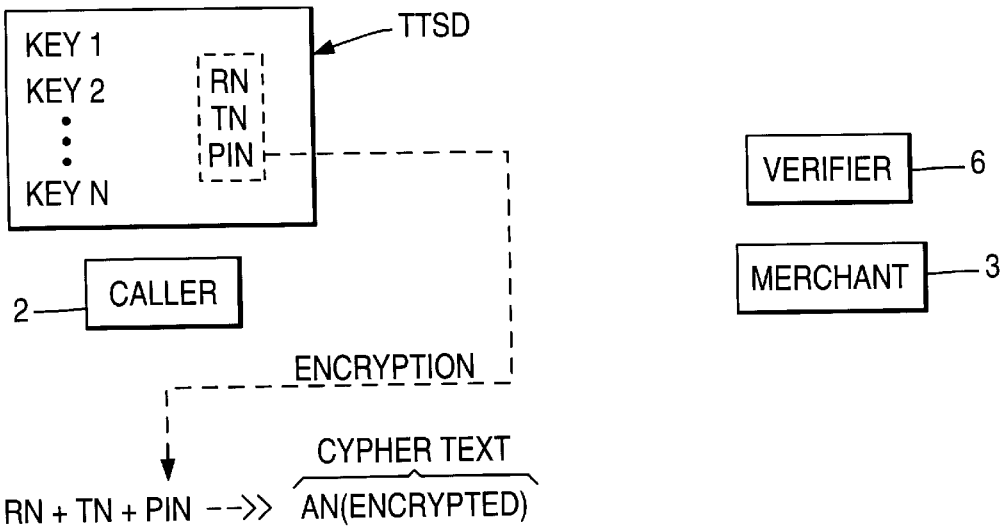
FIGS. 4A–4C illustrate a continuation of the sequence ending with FIG. 2C.

The TTSD encrypts the authorization number AN, to produce an encrypted authorization number, AN(ENCRYPTED), as indicated in FIG. 4A. The keys (eg, KEY1) shown within the TTSD represent various public keys stored within the TTSD, and used to perform the encryption. Public-key encryption is discussed below.

Figure 4B:
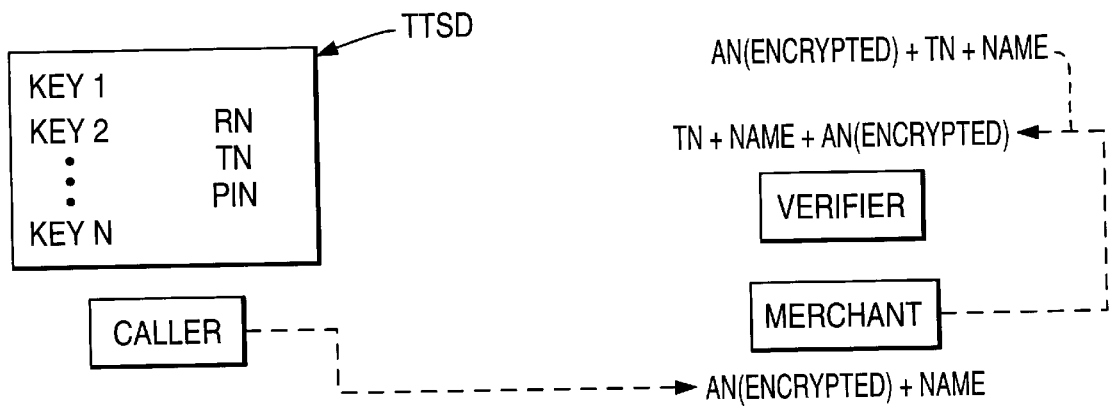

The AN(ENCRYPTED) (that is, the cypher text) is transmitted to the merchant 3, as indicated in FIG. 4B, preferably by using DTMF signals. At some point, the customer 3 gives his name, which comes into the possession of the merchant, as indicated in FIG. 4B.

The merchant 3 transmits the cypher text, AN(ENCRYPTED), the "plain text" TN, and the caller's name to the verifier 6, as indicated in FIG. 4B. This transmission can be done using DTMF signals. However, since transmission of numeric-type data using DTMF signals is rather slow (in the range of 2 to 20 numbers per second), compared with modem-type transmission, a faster type of transmission, such as the modem-type, is preferred for this transmission. (Modem-type transmission is not necessarily preferred for the TTSD of FIG. 1, because of the added cost of installing a modem into the TTSD, although such installation can be undertaken.)

Figure 4C:
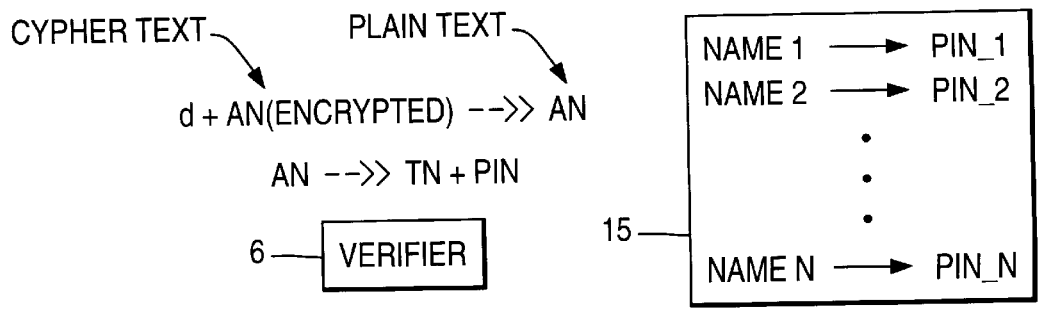

The verifier 6 is in possession of a private key, d, as indicated in FIG. 4C, as known in the art of public key encryption. The private key d allows the verifier to decrypt the cypher text, AN(ENCRYPTED), which was encrypted by the public key, and to obtain the plain text of AN. Since the verifier knows the type of format (illustrated in FIG. 3) which is used, the verifier can extract the TN and the PIN from the plain-text AN, as indicated in FIG. 4C.

The verifier is equipped with a table 15, which indicates the PINs assigned to each name within a list of names. The verifier 6, using the table 15, and the name provided by the caller 2, ascertains the PIN assigned to the caller. If the assigned PIN matches the PIN extracted from the cypher text in FIG. 4C, then the identity of the caller is considered verified.

The verifier informs the merchant 3 of the results, by transmitting two pieces of information to the merchant 3: whether the two PINs match, and the TN. Restated, the verifier transmits (1) a YES or NO, perhaps as a ONE or a ZERO, respectively, and (2) the TN. In effect, the verifier states, "For the given TN, the PIN is OK."

Since the merchant will probably receive numerous pieces of such information from verifiers, transmitting the TN to the merchant 3 serves to identify the particular customer, or transaction, which is being verified, so that the merchant knows which customer the verifier is talking about. Of course, if the merchant makes a sufficiently small number of inquiries of the verifier, then it may not be necessary for the verifier to transmit the TN each time. As an extreme example, if the merchant makes one inquiry per day, and if the verifier always responds within a short time, such as ten minutes, then the verifier need not necessarily transmit the TN. The merchant knows which transaction, or customer, the verifier is talking about.

Based on this information received from the verifier, the merchant 3 verifies the identify of caller 2.

It is recognized that the merchant 3 and the verifier 6 can share performance of the tasks recited above, or that the merchant can perform all of the tasks, and, in effect, replace the verifier 6.

Public-Key Encryption

The cypher text described above was generated using public-key encryption. Public-key encryption is known. An example of public-key encryption will be given. The Table below provides important definitions.

TABLE

Public key:

N — a product of two prime numbers, P and Q.
P and Q are maintained in secrecy.
e — a number relatively prime to the product
$(P - 1) \times (Q - 1)$.

Private key:

$d = e^{-1} \; (MOD(P - 1) \times (Q - 1))$.
(The expression "i MOD j" refers to the positive remainder when i is divided by j.)

Encryption process:

$c = m^e \; (MOD \; N)$
"m" is the plain-text message.
"c" is the cypher text.

De-cryption process:

$m = c^d \; (MOD \; N)$

As the Table indicates, the public key contains two parts, N and e. These are both made publicly available. For example, every bank issuing a credit card may publish its own public key. The publication can be done in a manner which allows remote downloading. For instance, a customer, such as caller 2 in FIG. 2, can dial a toll-free telephone number which transmits, in DTMF format, the public key of the bank.

A private key, d, exists, which is not public, but is known only to the verifier. The caller does not know the private key.

EXAMPLE

An example will illustrate the encryption-decryption process. Assume P=47 and Q=71. Then N=P×Q=3337.

Select the public key e, at random, to be 79. The public key e must contain no factors in common with (P−1)×(Q−1)=46×70=3220. Based on the foregoing, $d=79^{-1}$ (MOD 3220)=1019. The result of 1019 can be justified by rearrangement:

$d=1019=79^{-1}$ (MOD 3220)
1019×79=1(MOD 3220)=80,501
80,501/3220=25+1/3220

Since the remainder (ie, 1/3220) when multiplied by 3220, is unity, the original statement is confirmed.

At this point, the public key and the private key have been computed. Assume the plain-text authorization number, AN, is 668. The AN is encrypted according to the following expression: $688^{79}$ (MOD 3337)=1570. The cypher text is thus 1570. This number is transmitted to the verifier, as in FIG. 4B.

De-cryption by the verifier is done according to the following expression: $1570^{1019}$ (MOD 3337)=688. The plain-text AN, 668, is thus recovered.

For longer AN's, the AN can be broken into groups of small numbers, such as breaking the AN of 668243550 into three groups: 668, 243, and 550. Each group is encrypted separately. Breaking a large AN into small groups eliminates the step of raising a large AN to a large power, as required in computing c, the cypher text, in the Table. Raising a large number to a large power can cause computational difficulties in some computers.

Other encryption and de-cryption techniques, in addition to that discussed above, are discussed in *Applied Cryptography, Protocols, Algorithms, and Source Code in C*, Chapter 19, by Bruce Schneier, John Wiley & Sons, New York (1994). Perhaps the leading journal article on public-key cryptography is W. Diffie and M. Hellman, "New Directions in Cryptography," IEEE Transactions on Information Theory, Vol. IT-22, No. 6, November, 1978. The preceding two references are hereby incorporated by reference, with the Schneier book being incorporated in its entirety.

The following U.S. patents are hereby incorporated by reference:

| | | |
|---|---|---|
| 4,944,007 | Austin | July 24, 1990 |
| 4,689,478 | Hale | August 25, 1987 |
| 4,634,845 | Hale | January 6, 1987 |
| 4,405,829 | Rivest | September 20, 1983 |
| 4,424,414 | Hellman | January 3, 1984 |
| 4,200,770 | Hellman | April 29, 1980 |

Additional Considerations

Figure 5:
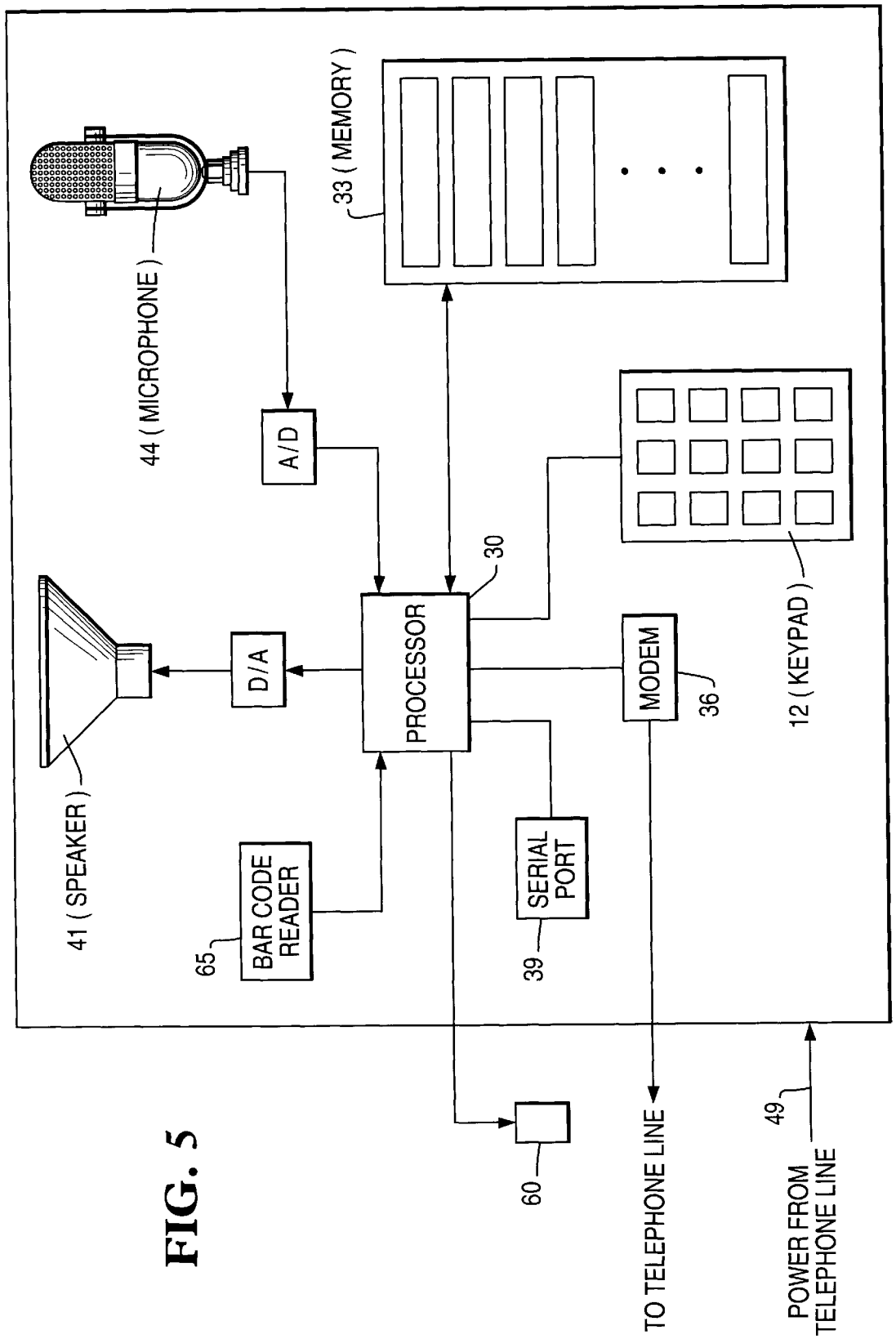
FIG. 5 illustrates one architecture of the invention.

1. FIG. 5 illustrates one architecture of the TTSD, which contains a microprocessor 30 and memory 33. The latter contains programs which control operation of the TTSD, and perform the tasks discussed above. The memory 33 also stores the public keys, including those permanently loaded at the time of manufacture, as described below, in point 5, and those loaded later. The microprocessor 30 also generates the random number RN, shown in FIG. 2C. Memory 33 also stores the TN and PIN which are temporarily loaded, for each transaction.

Modem 36 (which can be replaced by a DTMF encoder/decoder), allows transmission and reception of data. A serial port 39 can also be used for import and export of data.

Figure 6A:
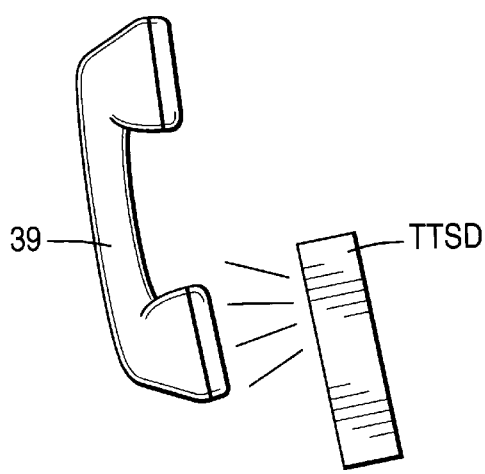
FIGS. 6A–6D illustrate forms and uses of the invention.
Figure 6B:
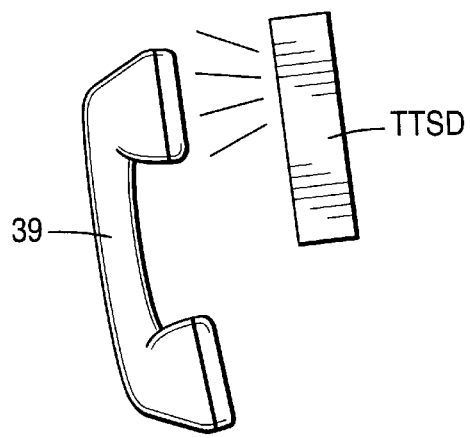

A speaker 41 and a microphone 44 allow the communication with a telephone handset, illustrated in FIGS. 6A and 6B, and described in point 2, below. A digital-to-analog converter, D/A in FIG. 5, drives the speaker 41, and an analog-to-digital converter A/D is driven by the microphone 44.

Additional features shown in FIG. 5 will be explained below.

2. The TTSD may take the form of a hand-held unit, as in FIG. 1, which communicates acoustically with a telephone handset 39, as indicated in FIGS. 6A and 6B. In FIG. 6A, the TTSD transmits information to the handset. In FIG. 6B, the TTSD receives information from the handset.

Figure 6C:
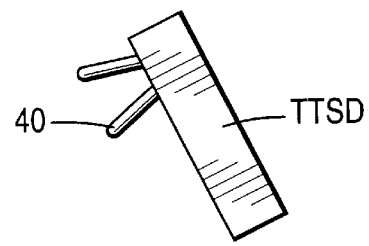

Acoustical shields 40 in FIG. 6C, resembling the fluid-filled muffs contained on radio headsets used by aircraft pilots, can be used to block external noise, to improve acoustic coupling between the TTSD and the handset.

Figure 6D:
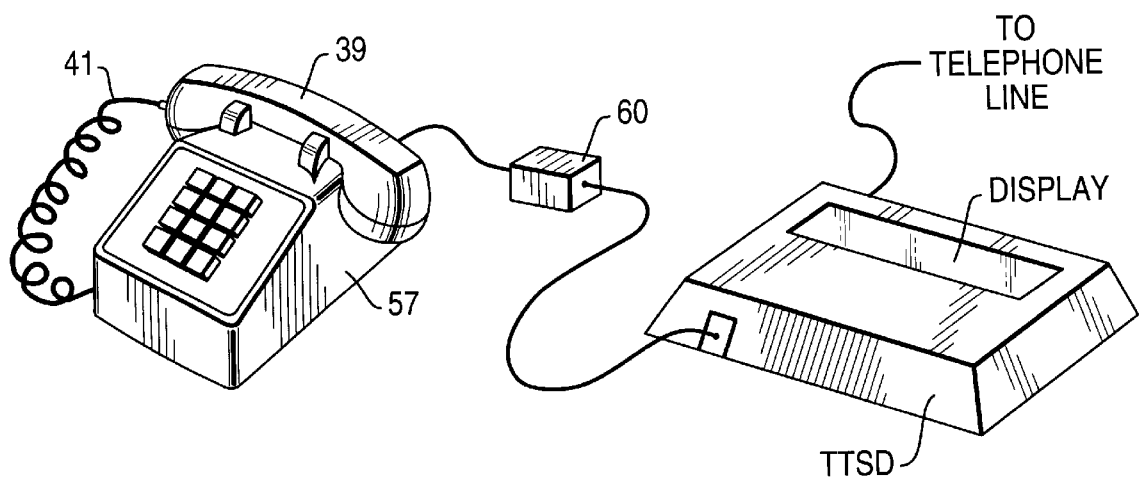

The TTSD may also be wired into the telephone line itself, as in FIG. 6D. In this case, it is possible for the TTSD to obtain its operating power from the telephone line itself, indicated by arrow 49 in FIG. 5, as by implementing it using low-power CMOS circuitry. As an alternate, it may be desirable to splice into the cord 41 of the handset 39 of FIG. 6D.

3. It is preferred that the public key be downloadable into the TTSD with a minimum of user involvement, as by following this procedure:

First, a user, in pursuit of a public key, dials an appropriate telephone number.

Next, a system answers the call, and prompts the user to select the public key desired.

In response, the system downloads the public key selected to the TTSD, which receives the information in one of the modes shown in FIG. 6.

In principle, this downloading is no different from downloading a file from a public computer service, such as the INTERNET.

Alternately, rather than responding to a request by a caller, the system can continually broadcast a public key. As an analogy, the U.S. Naval Observatory, at telephone number 303-499-7111, continually broadcasts the time-of-day. Any number of telephone callers can connect with the Observatory at once, and all callers hear a single recording of a voice, announcing the current time. Of course, if a given caller connects with the Observatory in the middle of a time announcement, the caller simply waits for the next full announcement.

The analogous TTSD public key system can repeatedly broadcast the public key. Each broadcast of a public key is preceded by a separator code. When a TTSD connects with the system, the TTSD may connect in the middle of a broadcast of a public key. The TTSD waits for the separator code, and then copies the key which follows.

If more than one key is broadcast, different separator codes can be transmitted between keys, giving the identity of the subsequent code.

As another alternate, the public keys can be published in newspapers, in bar-code form. The TTSD can be equipped with a bar-code reader 65 in FIG. 5, which reads the bar codes.

In the general case, loading a public key is a data-transfer operation, and such operations are well known.

4. Significantly, the TTSD contains no secret information. It is a generic product, publicly available. Successful use only requires entry of a secret PIN, and possibly a TN, at the time a transaction is undertaken.

5. It is possible that a given public key will never be changed, or changed rarely. Thus, since the public key (a) is publicly available and (b) will be rarely changed, it can be treated as a fixed, constant number. It may be permanently stored within the TTSD, along with other public keys, at the time of manufacture.

Such memory can be permanently non-volatile, as by using fusible read-only memory, ROM, in which metallic traces are physically melted, in order to store data. Alternately, such memory can be non-volatile, but alterable, such as EEPROM (Electrically Erasable Programmable Read Only Memory) provides. EEPROM is non-volatile, in the sense that it does not require electric power to maintain stored data. But, unlike fusible ROM, the stored data can be changed in EEPROM.

To accommodate addition of other public keys, additional memory space is made available, as in FIG. 5, which can be loaded in the manner described above.

6. Ease-of-use is an important attribute of many products. In one form of the invention, the user is completely non-involved with locating a public key, and with loading the public key into the TTSD, as described above. Instead, the verifier 6 or merchant 3 in FIG. 2 is charged with maintaining a necessary supply of public keys, because these parties are expected to have more convenient access to the public keys.

When a caller 2 contacts a merchant 3, the merchant transmits the public key to the caller, along with the transaction number TN of FIG. 2A. That public key is used in the encrypting step illustrated in FIG. 4A.

7. In a simplified form of the invention, only the PIN is encrypted using the public key. That is, the cypher text AN(ENCRYPTED) of FIG. 4A contains only the PIN.

In another form of the invention, both the PIN and the transaction number, TN, are encrypted using the public key. No random number is used as padding. That is, the cypher text AN(ENCRYPTED) of FIG. 4A contains only the PIN and the TN.

8. Even though the Table indicates that the public key contains two numbers, N and e, it is common usage to refer to these numbers as a single "key."

9. It is not necessary that an actual human being operate the TTSD. Computers, or intelligent agents, can deliver the PIN to the TTSD.

Figure 7:
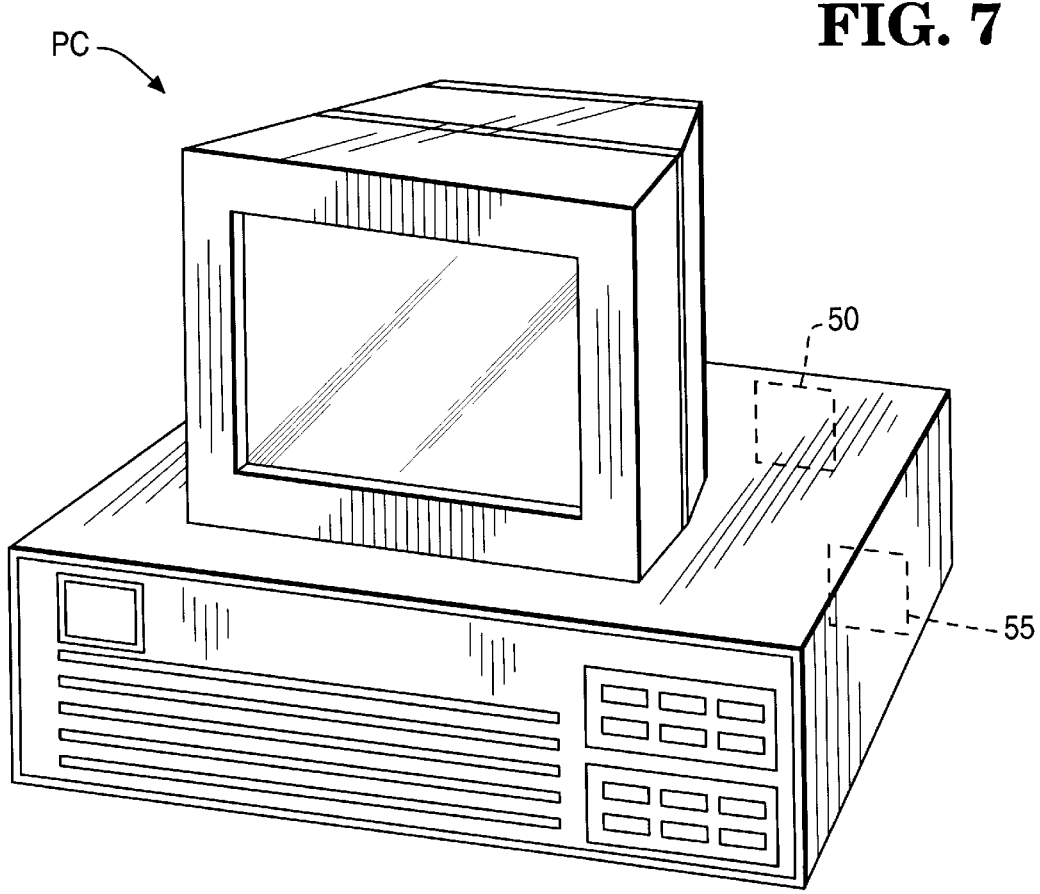
FIG. 7 illustrates another form of the invention.

10. In another form of the invention, a microcomputer in FIG. 7, such as the well known Personal Computer, PC, is used. Software 50 contained within the PC controls a modem 55, which retrieves the public keys from remote sources. The software contacts the merchant 3 in FIG. 2, and retrieves the transaction number TN.

The software prompts the user, as by a message on the PC's display, to enter the user's PIN. The software encrypts the TN and the PIN, and performs the other steps described above.

11. The term "PIN" was used above, which is an acronym for "Personal Identification Number." A PIN is not required to be literally a number, but, in the general case, can be any sequence of symbols.

12. It should be observed that encoding a word spelled in English letters, such as a name, or an Arabic number, such as "14," into ASCII code does not amount to "encryption." One reason is that translating the ASCII code into human-intelligible form is utterly straightforward. Another reason is that encoding into ASCII code does not conceal anything.

13. It was stated above that modem transmission can be used. Voice-modems are available, which allow voice communication to accompany data transmission, and can be used to allow voice entry of some information (such as PINs) and automated entry of other information (such as TNs, by a computer program).

14. The name of the caller, indicated in FIG. 4B, can be spoken to the merchant 3, or can be encrypted into the cypher text. In the latter case, the format of the cypher text will be modified from that of FIG. 3, in order to accommodate the presence of the name.

15. In the apparatus of FIG. 6D, the telephone user should remain silent while the TTSD transmits the cypher text. This silence can be enforced by a switch 60 which disconnects the telephone 57 from the telephone line, during the transmission of cypher text. The switch 60 can be manually actuated by the user, in which case the switch can be springloaded, so that the disconnection only occurs so long as the switch is depressed by the user. Alternately, the switch 60 can be controlled by the processor 30 in FIG. 5, which disconnects the telephone 57 during transmission of the cypher text.

Numerous substitutions and modifications can be undertaken without departing from the true spirit and scope of the invention. What is desired to be secured by Letters Patent is the invention as defined in the following claims.

I claim:

1. An encryption device, comprising:
   a) storage means containing a first, public, key;
   b) means for accepting a personal identification number (PIN) from a user;
   c) means for encrypting the PIN, using the first key; and
   d) means for transmitting the encrypted PIN to a receiver, located outside the device.

2. Device according to claim 1, and further comprising means for loading additional keys into the storage means.

3. Device according to claim 2, in which said means for loading comprises a bar code reader.

4. Device according to claim 1, in which said means for transmitting uses Dual-Tone Multi-Frequency signals.

5. Device according to claim 1, in which said means for transmitting comprises a telephone modem.

6. Device according to claim 1, and further comprising:
   e) means for receiving a transaction number from a remote party, by telephone.

7. Device according to claim 6, in which the means for encrypting encrypts the transaction number.

8. Device according to claim 1, and further comprising:
   e) display means for displaying information entered by the user.

9. A method of verifying identity of a person, comprising the following steps:
   a) receiving cyphertext and a name from the person;
   b) deriving a derived PIN from the cypher text;
   c) maintaining a table which indicates PINs which are assigned to respective names;
   d) ascertaining an assigned PIN which is associated with said name; and
   e) determining whether the derived PIN matches the assigned PIN.

10. In a transaction wherein a remote party makes contact with a person who wishes to verify identity of said remote party, the improvement comprising the following steps:
    a) after said contact is made, making available multiple publicly available keys to the remote party;
    b) accepting information from the remote party which selects a public key from the multiple keys; and
    c) transmitting the selected key to the remote party.

11. An encryption apparatus, comprising:
    a) first means for accepting a Transaction Number, TN, and a Personal Identification Number, PIN, from a user;
    b) second means for
       i) generating a random number;
       ii) combining the random number with the TN and PIN, to form an Authorization Number, AN;
       iii) encrypting the AN into cyphertext; and
    c) third means, for making the cypher text available outside the encryption apparatus.

12. Apparatus according to claim 11, in which the first means comprises:
    i) a keypad for accepting the PIN.

13. Apparatus according to claim 11, in which the first means further comprises:
    ii) means for accepting the TN from a telephone.

14. Apparatus according to claim 11, in which the third means comprises a visual display.

15. Apparatus according to claim 11, in which the third means comprises means for transmitting the cyphertext by telephone.

16. A device for connection to a telephone which communicates on a telephone line, comprising:
    a) first means for accepting numbers from a keypad, which are keyed in by a user;
    b) second means for encrypting said numbers into cyphertext;
    c) third means for transmitting said cyphertext on said telephone line and
    d) connection means for connecting to said telephone line, while allowing normal operation of said telephone.

17. Device according to claim 16, and further comprising
    d) means for generating multiple random numbers which are used as padding with said numbers,
    and in which the second means encrypts both the numbers and padding.

18. Device according to claim 16, and further comprising:
    a) a public encryption key, stored within the device.

19. Device according to claim 16, in which no secret passwords or keys are permanently stored.

20. Device according to claim 16, in which all passwords and all keys permanently stored therein are publicly available.

* * * * *